United States Patent
Grafling et al.

(10) Patent No.: US 9,735,718 B2
(45) Date of Patent: Aug. 15, 2017

(54) ALTERNATOR CONTROL WITH TEMPERATURE-DEPENDENT SAFETY FEATURE

(71) Applicant: Infineon Technologies AG, Neubiberg (DE)

(72) Inventors: Martin Grafling, Graz (AT); Christoph Seidl, Graz (AT)

(73) Assignee: Infineon Technologies AG, Neubiberg (DE)

( * ) Notice: Subject to any disclaimer, the term of this patent is extended or adjusted under 35 U.S.C. 154(b) by 34 days.

(21) Appl. No.: 14/797,814

(22) Filed: Jul. 13, 2015

(65) Prior Publication Data

US 2016/0380567 A1 Dec. 29, 2016

Related U.S. Application Data

(60) Provisional application No. 62/186,010, filed on Jun. 29, 2015.

(51) Int. Cl.
  *H02P 9/00* (2006.01)
  *H02J 7/00* (2006.01)
  *H02P 9/48* (2006.01)

(52) U.S. Cl.
  CPC ............ *H02P 9/006* (2013.01); *H02J 7/0029* (2013.01); *H02P 9/48* (2013.01)

(58) Field of Classification Search
  CPC ............................. H20P 9/006; H02J 7/0029
  USPC .......... 322/17, 28, 59, 89, 33, 34; 290/40 R, 290/40 B; 320/150; 323/285
  See application file for complete search history.

(56) References Cited

U.S. PATENT DOCUMENTS

| | | | | |
|---|---|---|---|---|
| 4,305,254 A * | 12/1981 | Kawakatsu | ............... | B60K 6/48 180/65.25 |
| 4,659,977 A * | 4/1987 | Kissel | ....................... | H02J 7/16 320/150 |
| 5,402,007 A * | 3/1995 | Center | .................. | H02J 7/1446 123/367 |
| 5,528,148 A * | 6/1996 | Rogers | ................ | B60L 11/1861 320/137 |
| 6,455,951 B1* | 9/2002 | Shultz | .................... | H02J 7/1423 307/10.1 |
| 7,292,007 B2* | 11/2007 | Aoyama | ............... | H02J 7/1461 322/24 |
| 8,089,169 B2* | 1/2012 | Maeda | ................... | H02J 7/1461 290/40 C |
| 2006/0181248 A1* | 8/2006 | Aoyama | ............... | H02J 7/1461 322/28 |
| 2008/0067981 A1* | 3/2008 | Inaba | ........................ | H02P 6/16 322/20 |
| 2009/0184692 A1* | 7/2009 | Owens, Jr. | ................ | H02J 7/14 322/23 |

(Continued)

*Primary Examiner* — Julio C Gonzalez Ramirez
(74) *Attorney, Agent, or Firm* — Baker Botts L.L.P.

(57) ABSTRACT

A method for controlling an alternator includes determining a temperature-dependent value associated with a battery coupled to an alternator and determining an excitation emergency threshold for the alternator based on the determined temperature-dependent value associated with the battery. The method further includes initiating, by a controller of an alternator, at least one safety measure upon a determination that a voltage associated with the battery exceeds the determined excitation emergency threshold.

20 Claims, 5 Drawing Sheets

(56) References Cited

U.S. PATENT DOCUMENTS

2011/0005212 A1\* 1/2011 Matsushita ............. F02D 29/02
 60/299
2013/0264975 A1\* 10/2013 Kaita .................. B60L 11/1853
 318/139

\* cited by examiner

ALTERNATOR CONTROL WITH TEMPERATURE-DEPENDENT SAFETY FEATURE

CROSS-REFERENCE TO RELATED APPLICATIONS

This application claims the benefit under 35 U.S.C. §119 (e) of U.S. Provisional Application No. 62/186,010, entitled, "Alternator Control with Temperature-Dependent Safety Feature," filed on Jun. 29, 2015.

TECHNICAL FIELD OF THE PRESENT DISCLOSURE

The technical field of the present disclosure relates generally to alternators, and, more particularly, to systems and methods for controlling an alternator with a temperature-dependent safety feature.

BACKGROUND

Modern alternators face increasing demands for greater operational safety and an increasingly reduced risk of hazardous conditions that may result from electronic or other faults. For example, to ensure safety and preserve battery life, an alternator may maintain a charging voltage within an appropriate margin of the operational charging limit of the battery being charged. Electronic faults or other equipment failures, however, may result in the battery being charged at an undesirable voltage, such as one beyond the operational limit of the battery. Such charging conditions may limit the useful life of the battery or, worse, result in catastrophic failure, such as fires, explosions, and/or other safety hazards. Safety standards imposed on modern alternator control systems increasingly demand that the risk of such hazardous conditions be reduced and/or eliminated.

SUMMARY OF THE PRESENT DISCLOSURE

According to one embodiment, a method for controlling an alternator includes determining a temperature-dependent value associated with a battery coupled to an alternator and determining an excitation emergency threshold for the alternator based on the determined temperature-dependent value associated with the battery. The method further includes initiating, by a controller of an alternator, at least one safety measure upon a determination that a voltage associated with the battery exceeds the determined excitation emergency threshold.

According to another embodiment, an apparatus includes an output configured to provide a charging voltage and a control circuit coupled to the input. The control circuit is operable to determine a temperature-dependent value associated with a battery coupled to an alternator and determine an excitation emergency threshold for the alternator based on the determined temperature-dependent value associated with the battery. The control circuit is also operable to initiate at least one safety measure upon a determination that the output voltage exceeds the determined excitation emergency threshold.

According to another embodiment, a system includes an alternator configured to provide a charging voltage to a vehicle battery and an engine control unit coupled to the alternator via an interface. The alternator includes a circuit to control the alternator configured to determine, based on information received from the engine control unit via the interface, a temperature-dependent value associated with a battery coupled to the alternator and to determine an excitation emergency threshold for the alternator based on the determined temperature-dependent value associated with the battery. The circuit is also configured to initiate at least one safety measure upon a determination that the charging voltage exceeds the determined excitation emergency threshold.

Certain embodiments of the present disclosure may provide a number of technical advantages. For example, a technical advantage of some embodiments may include the ability to provide a temperature-dependent safety path to disable the alternator output voltage. Some embodiments may disable the alternator voltage output based on determining that the output voltage exceeds the temperature-dependent excitation emergency threshold. The present disclosure recognizes that battery voltages above particular thresholds may cause an undesired chemical reaction within one or more battery cells that may produce outgassing and/or an undesired capacity loss. The outgassing threshold for particular batteries may be dependent not only on the battery voltage, but upon the temperature of the battery as well. Thus, the present disclosure recognizes that an appropriate excitation limit for charging a battery may also depend on temperature of the battery under charge. Accordingly, a technical advantage of certain embodiments of the present disclosure may include appropriately modifying the excitation emergency threshold based on a temperature-dependent variable. A temperature-dependent excitation emergency threshold may thus allow the alternator to account for the temperature-dependent nature of battery outgassing at various charging voltages.

In addition or in the alternative, the present disclosure recognizes that excitation emergency thresholds, and the nature of their respective temperature dependencies, may depend on various sizes, capacities, types, chemical characteristics, product name, product number, product manufacturer, and other characteristics of the particular battery and/or battery type under charge. Thus, another technical advantage of certain embodiments may include adjusting the temperature-dependent excitation emergency threshold to account for the particular characteristics of the particular battery and/or battery type under charge. According to the principles of the present disclosure, various embodiments may substantially reduce and/or eliminate risk associated with electronic and/or other faults that would otherwise lead to hazardous conditions, such as fires, explosions, or other safety concerns. The principles of the present disclosure may also be applied in particular embodiments to increase charging efficiency at various temperatures and/or increase battery life. Another technical advantage may include the ability to provide and/or contribute to providing alternator products that are compliant with, for example, ASIL-C and/or ASIL-D targets for the ISO 26262 functional safety standard.

Certain embodiments in which temperature information may not explicitly be available to the circuit to control the alternator may also benefit from the teachings of the present disclosure. In particular, there may be some embodiments in which an engine control unit may have a communication link or interface with the circuit to control the alternator. Particular embodiments of the engine control circuit may not be programmed to transmit explicit measurements of temperature to the circuit to control the alternator. Likewise, there may be embodiments in which the circuit to control the alternator is not wired or otherwise configured to receive temperature information from battery and/or engine compartment sensors. The teachings of the present disclosure may allow temperature to be inferred and/or extrapolated from voltage set point in particular embodiments, which may be transmitted to the circuit to control the alternator by the engine control unit. This may allow for a temperature-dependent safety feature to be implemented by the circuit to control the alternator without significant reprogramming of the engine control unit and/or rewiring of the alternator to connect various sensors.

Although specific advantages have been enumerated above, various embodiments may include, all, some, or none of the enumerated advantages. Additionally, other technical advantages may become readily apparent to one of ordinary skill in the art after review of the following figures, description, and claims.

BRIEF DESCRIPTION OF DRAWINGS

For a more complete understanding of the present invention and its advantages, reference is now made to the following description, taken in conjunction with the accompanying drawings, in which like reference numbers indicate like reference numbers, and wherein.

DETAILED DESCRIPTION OF EXAMPLE EMBODIMENTS

The present disclosure provides methods and systems for alternator control with a temperature-dependent safety feature. For example, an alternator may be equipped with a safety feature that may be enabled or triggered in the event that the alternator output voltage surpasses a particular safety and/or emergency threshold. The teachings of the disclosure recognize that safe alternator output voltages, which may be used to charge a battery, may vary according to battery temperature and thus the present disclosure recognizes that it may be beneficial to provide an excitation emergency threshold that varies according to battery temperature.

Specific embodiments of the present disclosure and its advantages are best understood by referring to FIGS. 1A through 5, wherein like numerals refer to like and corresponding parts of various drawings.

Figure 1A:
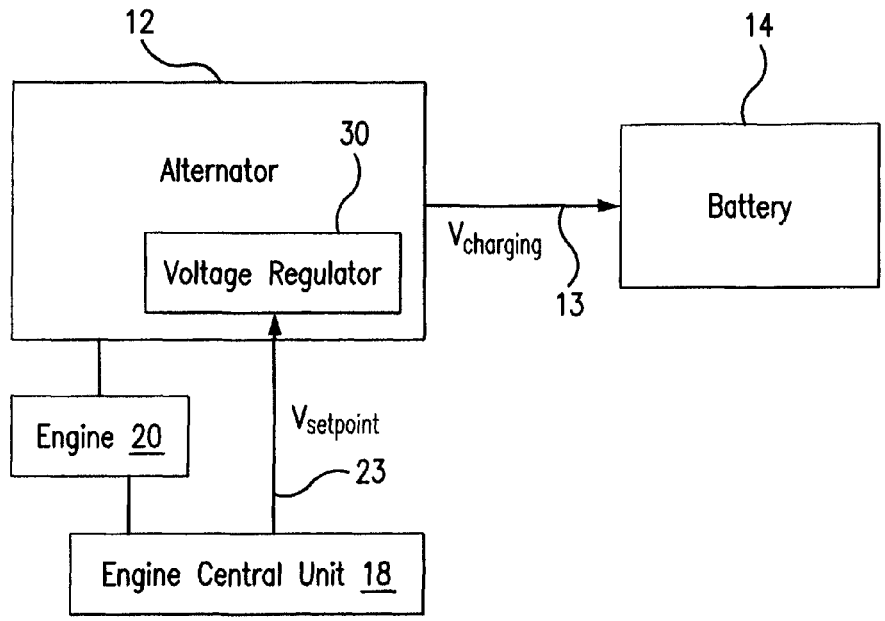
FIG. 1A is a block diagram illustrating an alternator system that may benefit from the teachings of the present disclosure.

FIG. 1A is a block diagram showing a system that may benefit from the teachings of the present disclosure. In FIG. 1A, an alternator 12, which is a form of electronic generator, generates a charging voltage 13 that can be used to charge a battery 14 and/or provide a source voltage to other electronic components (not explicitly shown). A common application of alternator 12 is in vehicular systems (such as a car or truck), in which alternator 12 is driven mechanically by the power train of an engine 20. Engine 20 is controlled by an engine control unit 18. Generally speaking, alternator 12 in such applications may convert mechanical energy from the rotation of the engine's crankshaft into electrical energy that may be stored by battery 14 and/or used by various other electrical components within the vehicle (not explicitly shown). To provide an appropriate level for charging voltage 13, alternator 12 may include a voltage regulator 30 or other appropriate control circuit, to regulate charging voltage 13 based on voltage set point 23. A voltage set point 23 for charging voltage 13 may be specified by engine control unit 18.

Figure 1B:
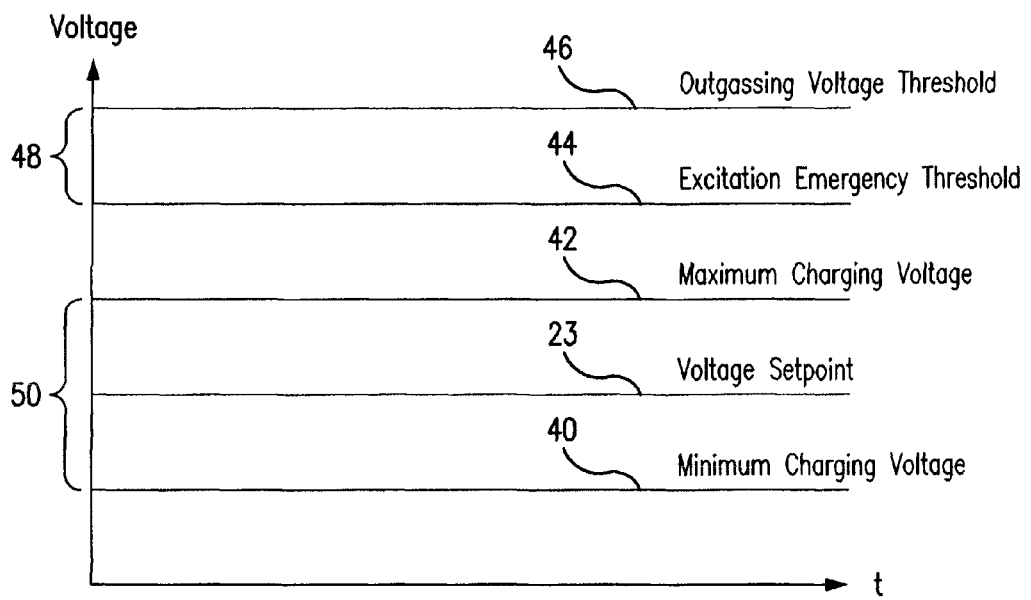
FIG. 1B is a graph of voltage versus battery temperature showing a plurality of voltage values associated with a battery.
Figure 4:
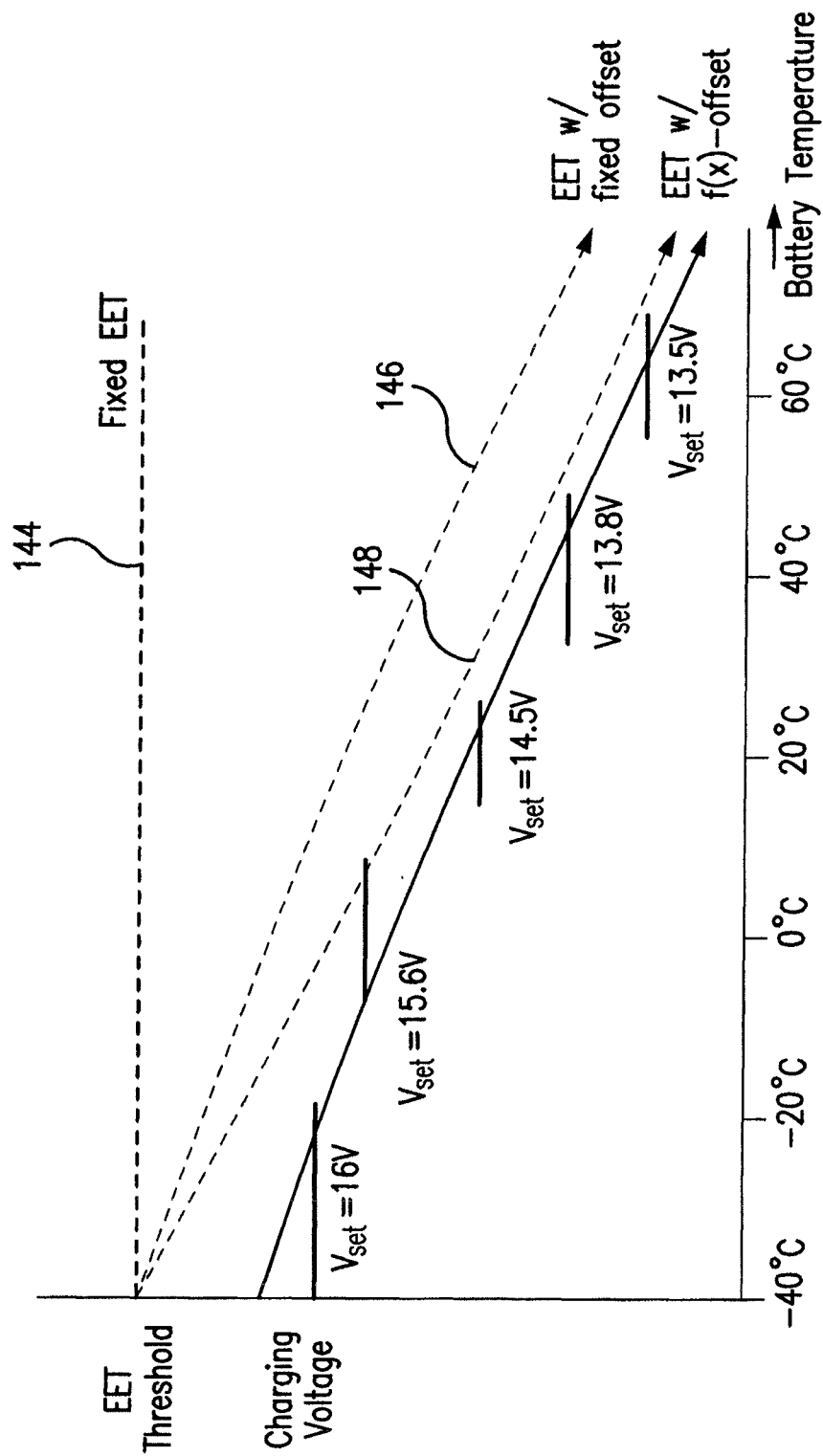
FIG. 4 is a chart illustrating particular voltage characteristics over temperature for various embodiments of a excitation emergency off feature.

FIG. 1B is a graph of voltage versus battery temperature showing a plurality of voltage values associated with battery 14. In this graph, the various voltage levels are shown as constant with respect to temperature of battery 14; however, as described herein, these voltage levels may vary with temperature of battery 14 according to the teachings of the present disclosure (as shown in FIG. 4). Battery 14 may have a desired voltage range 50 for charging that extends from a minimum charging voltage 40 to a maximum charging voltage 42, with a nominal desired level for charging voltage 13 specified as voltage set point 23. Battery 14 may also have an outgassing voltage threshold 46 at or above which charging may be considered hazardous. For example, particular batteries 14 may include various charging voltages 13 for which it may be appropriate for battery 14 to receive a charge. Lead acid batteries may, for instance, be charged at or above 2.15V per cell, or about 12.9 V for a 6-cell battery. If minimum charging voltage 40 is not reached, battery 14 may not take a charge. On the other hand, batteries 14 that are charged at a charging voltage 13 higher than the outgassing voltage threshold 46 may experience a chemical reaction that leads to outgassing and/or an undesired capacity loss. If a charging voltage 13 that is above maximum charging voltage 42 and/or above the outgassing voltage threshold 46 is applied to battery 14 for too long of a time period, battery 14 could explode and/or catch fire. Even in the absence of hazardous results such as explosion or fire, charging battery 14 at undesirably high charging voltages 13 at or near the outgassing voltage threshold 46 may limit the useful life of the battery 14 and/or lead to failure of battery 14. Excitation emergency threshold 44 is associated with a charging voltage 13 below which charging battery 14 is considered safe and/or acceptable and/or above which charging battery 14 may be considered dangerous. Excitation emergency threshold 44 may also include some margin of safety and/or error between excitation emergency threshold 44 and the outgassing voltage threshold 46 of battery 14, as indicated by range 48 in FIG. 1B. Excitation emergency threshold 44 is described in greater detail below.

Referring to FIG. 1A, in some cases it may be desirable to provide a safety mechanism with the capability to disable alternator 12 from outputting charging voltage 13 under certain fault conditions. For example, manufacturing defects, wear over time, and/or other "glitches" may, in some cases, possibly cause charging voltage 13 to enter a state in which a power switch of voltage regulator 30 may become stuck in the "ON" position, thereby causing alternator 12 to constantly output an unacceptably high charging voltage 13. In this instance, a "glitch" may cause voltage set point 23 to be ignored, and voltage regulator 30 may not necessarily have another practical way to disable charging voltage 13. For example, an on-chip fault in engine control unit 18 and/or alternator voltage regulator 30 may randomly occur that causes voltage regulator 30 to become stuck in the "ON" position. In such circumstances, the engine control unit 18 may no longer be capable of controlling charging voltage 13. This may lead to catastrophic failure of battery 14, including fire and/or explosion if the unacceptably high charging voltage 13 is applied for an extended period of time. Under certain circumstances, outgassing may be a very serious safety concern. Harmful gasses from battery 14 may, for example, enter the passenger compartment and cause harm to passengers of the vehicle. Thus, a desirable safety feature may include emergency disabling of charging voltage 13. This may, in some embodiments, be referred to by the present disclosure as an "excitation emergency off" feature. In one example, a power switch (not explicitly shown in FIG. 1A) within voltage regulator 30 may be automatically disabled in the event that charging voltage 13 is at, near, or over the outgassing voltage threshold at battery 14. This threshold may be referred to in various embodiments of the present disclosure as an "excitation emergency threshold," one example of which is illustrated in FIG. 1B by line 44.

Although shown as constant with respect to temperature in FIG. 1B, voltage set point 23 of a particular battery 14 may be adjusted based on the temperature of battery 14. Engine control unit 18 (or other appropriate controller) may take into account temperature profiles for various types of battery 14 and may specify voltage set point 23 based on the temperature and type of battery 14. Further, minimum charging voltage 40 and maximum charging voltage 42 for a given battery 14 may vary based on various environmental factors, including temperature of battery 14 and the particular characteristics of battery 14. Accordingly, it is desirable for the alternator 12 to provide a variable charging voltage 13 that is within the desired minimum charging voltage 40 and maximum charging voltage 42 for battery 14 for charging in various temperatures. For example, for a 6-cell lead acid battery, the desired voltage range for charging voltage 13 for charging at −20 degrees Celsius may be 16.02 to 16.56 V, while the desired voltage range for charging voltage 13 for charging at 20 degrees Celsius may be 14.58 to 15.18 V. For other types of battery 14, such as lithium ion, charging voltage 13 may be lower at similar temperatures. In some embodiments, certain operational situations may additionally or alternatively make changes in charging voltages 13 desirable. For example, alternator 12 may be configured to apply a negative momentum to the momentum of the associated combustion engine. As another example, engine control unit 18 could decide to reduce charging voltage 13 to reduce the load on engine 18 (such as in a situation calling for rapid acceleration). Thus, voltage set point 23 can be modified on an as-desired basis. Engine control unit 18, (or an on-board computer, or other appropriate controller) may include and/or be coupled to battery temperature sensors and/or other appropriate sensors (not explicitly shown) that allow determination of the temperature of battery 14. The temperature sensors may be located on or within battery 14 itself or elsewhere within the engine compartment. Engine control unit 18 may accordingly store temperature tables, profiles, and/or appropriate algorithms that allow determination of an appropriate voltage set point 23 for the particular type and temperature of battery 14. Voltage set point 23 may be output via any appropriate communication protocol to voltage regulator 30, which can, in turn, use voltage set point 23 as well as other appropriate information to set an appropriate charging voltage 13.

The present disclosure recognizes that outgassing voltage threshold 46 of battery 14 changes based on temperature. It is therefore advantageous to also provide an excitation emergency threshold 44 that varies according to how outgassing voltage threshold 46 varies with temperature. Also, because outgassing voltage threshold 46 may also vary based on the particular type of battery 14 under charge, it may be additionally or alternatively advantageous to provide an excitation emergency threshold 44 that varies based on temperature and/or type of battery 14. For example, an appropriate excitation emergency threshold 44 may be lower for particular lithium ion batteries as compared to particular lead acid batteries at the same or similar temperature, owing to particular lithium ion batteries having a lower outgassing voltage threshold 46 than said lead acid batteries.

Accordingly, using an excitation emergency threshold 44 that depends on temperature of battery 14 may offer various improvements over using a fixed excitation emergency threshold 44. Because outgassing voltage threshold 46 is a function of temperature in which outgassing voltage threshold 46 decreases as temperature increases, it may be desirable to appropriately lower excitation emergency threshold 44 as a function of increasing temperature. Such a feature may prevent hazards from occurring and/or extend the life of battery 14 by ensuring that battery 14 is not charged by charging voltage 13 at excessive levels that may cause damage to battery 14. Although illustrated in FIG. 1B as a voltage, as discussed herein, excitation emergency threshold 44 may refer to any appropriate value and/or voltage at and/or above which it would be appropriate to disable charging voltage 13. For example, excitation emergency threshold 44 may be a current value within, or provided by, alternator 12 that would result in a charging voltage 13 at, near, or over outgassing threshold voltage 46.

Although taking into account the temperature of battery 14 in regulating the excitation emergency threshold 44 for charging voltage 13 is desirable, the present disclosure also recognizes that while particular embodiments of alternator 12 may have access to temperature sensor data from battery temperature sensors or other engine compartment sensors, other alternators 12 may not have direct access to such information. For example, engine control unit 18 may have access to the temperature of battery 14 and use it to set voltage set point 23, but voltage regulator 30 may not have access to such temperature information in order to set excitation emergency threshold 44 based on the temperature of battery 14. Moreover, the temperature of voltage regulator 30 may not match the temperature of battery 14 because voltage regulator 30 may be mounted to alternator 12, which may be in a location remote from battery 14 and/or may have different operating temperatures. As a result, it may be desirable for voltage regulator 30 to include a way to determine an appropriate excitation emergency threshold 44 based on temperature information for battery 14. For example, excitation emergency threshold 44 may be determined based on temperature data and/or values received from various temperature sensors located within the engine compartment and/or within the vicinity of battery 14.

As stated above, in some implementations, engine control unit 18 has access to temperature information for battery 14, but voltage regulator 30 does not. Further, it may be difficult to communicate temperature information from engine control unit 18 to voltage regulator 30. As a result, because engine control unit 18 communicates voltage set point 23 to voltage regulator 30, and voltage set point 23 may depend on the temperature of battery 14 (as described above), control of charging voltage 13 based on temperature may be effected by using voltage set point 23 as a proxy for temperature of battery 14. In other words, the temperature of battery 14 may be inferred by voltage regulator 30 from the received voltage set point 23, even if voltage regulator 30 does not have explicit access to the temperature of battery 14. This allows control of charging voltage 13 that is dependent on the temperature of battery 14. Providing a temperature-dependent safety feature may allow alternator 12 to turn "off" and/or disable charging voltage 13 in the event that excitation emergency threshold 44 is exceeded. Accordingly, the present disclosure provides various embodiments of methods, systems, and apparatus for alternator control with a temperature-dependent excitation emergency off feature.

Figure 2:
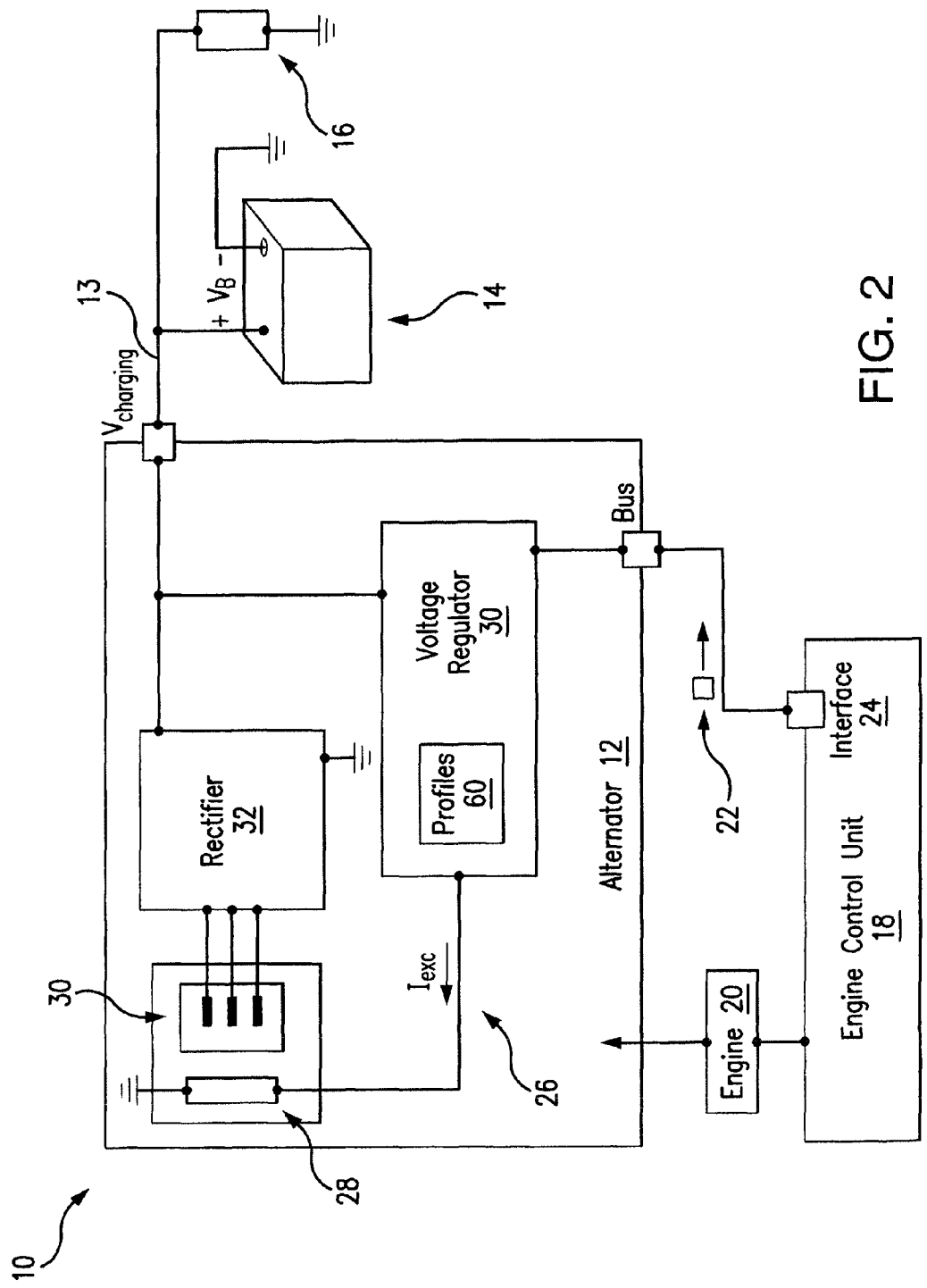
FIG. 2 is a block diagram illustrating a system for alternator control with a temperature-dependent safety feature.

FIG. 2 is a block diagram illustrating a system 10 for alternator control with a temperature-dependent safety feature. System 10 includes alternator 12, battery 14, engine control unit 18, engine 20, and voltage regulator 30, which were described generally above with respect to FIG. 1A. Also shown in FIG. 2 are vehicular loads 16. Information 22 may be exchanged between engine control unit 18 and alternator 12 via an interface 24. Generally speaking, system 10 converts mechanical energy from engine 20 to electrical energy usable by battery 14 and other vehicular loads 16 using alternator 12, producing charging voltage 13. Engine control unit 18 may receive inputs from various temperature sensors in order to provide an appropriate voltage set point 23 (as part of information 22) to alternator 12 via interface 24. The various illustrated components of alternator 12 may function to provide an appropriate excitation current 26 that is calculated to cause alternator 12 to output a desired charging voltage 13 to battery 14 and/or vehicular electronic loads 16. The desired charging voltage 13 may be determined based on information 22 received from interface 24 of engine control unit 18, as well as any other appropriate information as discussed herein. Information 22 may represent any appropriate temperature-dependent value such as temperature sensor data, one or more voltage set points 23, or other appropriate temperature-dependent information. Information 22 may also represent other appropriate information in addition or alternatively to temperature-dependent information. It should also be understood that while illustrated as being received via interface 24, alternator 12 may determine temperature based on any appropriate source, including directly and/or indirectly from sensors associated with battery 14 and/or within the engine compartment.

Alternator 12 represents any combination of appropriate hardware, software, mechanical components, and/or controlling logic to receive and/or convert mechanical energy from engine 20 into an appropriate charging voltage 13 for charging battery 14 and providing energy to other vehicular loads 16. Alternator 12 may represent any appropriate type of alternator, including a linear alternator, a poly-phase alternator, a brushless alternator, an AC and/or DC generator, traction alternator, and/or any other appropriate type of alternator. Alternator 12 typically includes a rotor shaft that may be coupled to engine 20 via a mechanical coupling link, such as a serpentine belt, that connects rotor 28 to a crank shaft of engine 20. The mechanical coupling delivers mechanical power to rotor 28 from the power train of engine 20. Alternator 12, as illustrated, includes voltage regulator 30, which generates an appropriate excitation current 26 to rotor 28, thereby causing stator 30 to generate an alternating current. Rectifier 32 converts the alternating current to direct current in order to provide an output voltage charging voltage 13.

Voltage regulator 30 may receive information 22 via interface 24 from engine control unit 18. Voltage regulator 30 may provide excitation current 26 to rotor 28. Excitation current 26 and rotation of the rotor 28 may induce an electrical current in stator 30, thereby producing three-phase alternating current to rectifier 32. Although not illustrated, rectifier 32 may include an appropriate network of diodes and/or other components to rectify alternating current into direct current. Appropriate filters may then be applied to produce a constant charging voltage 13. As described above, charging voltage 13 may be utilized as a charging and/or supply voltage to battery 14 and other vehicular loads 16. Charging voltage 13 may additionally or alternatively be fed back to voltage regulator 30 to assist in the alternator control functions described below in more detail with respect to FIG. 3.

Battery 14 may be any appropriate form of container for one or more cells in which chemical energy may be converted into electricity and used as a source of electric power. Battery 14 may be any appropriate type of battery including lead acid battery, lithium ion battery, aluminum, or other appropriate type. Battery 14 may, in some embodiments, represent a lithium ion battery. In some embodiments, battery 14 may be a typical six-cell lead acid battery provided in common vehicular applications. Battery 14 may be used to initiate power to a starter motor and/or provide power to other on board electrical components 16 within a vehicle.

Vehicular loads 16 may represent any appropriate electrical components that may receive power from alternator 12 and/or battery 14. For example, vehicular loads may include an electronic dashboard comprising various instruments, and/or may include radios, air conditioning components, on-board computers, engine control unit 18, seat control, window control, windshield wipers, heated seats, steering wheel controls, rearview mirror controls, and/or various other common vehicular components that may require electrical power for operation.

Engine control unit 18 represents any appropriate combination of hardware, software, controlling logic, and/or circuitry operable to control, monitor, and/or optimize the administration of particular tasks and/or functions of engine 20. Engine control unit 18 may, for example, function to control particular actuators within engine 20 to facilitate engine performance. For example, engine control unit 18 may include a series of inputs connected to various sensors within the engine compartment and engine 20. Based on sensed information and/or feedback, engine control unit 18 may control the timing sequence of cylinders within engine 20 and/or may control the timing of various valves that allow fuel and/or fuel mixtures to enter the cylinders and/or for waste gasses to exit the cylinders. Additionally or alternatively, engine control unit 18 may include control, measurement, and sensing functions associated with various other components and accessories connected to engine 20 such as a power steering module, water pump, brake components, and/or radiator. Engine control unit 20 may include an interface 24 to exchange information 22 with alternator 12. In general, engine control unit 18 may provide electronic feedback and control to various components of a vehicular control system. Engine control unit 18 may receive inputs from various sensors in order to optimize the air fuel mixture in cylinders of engine 20, control ignition timing, and/or control idle speed within engine 20.

In some embodiments, engine control unit 18 may also include inputs to receive temperature sensor information from one or more temperature sensors associated with battery 14. The sensed temperature information may be associated directly or indirectly with the actual temperature of battery 14. For example, the temperature sensors may be located in an appropriate location within the engine compartment and/or may be configured to sense the general temperature of the engine compartment within which battery 14 may be located. As another example, some embodiments may include a battery-specific temperature sensor to measure the temperature of battery 14 and/or a temperature of one or more cells of battery 14. Accordingly, engine control unit 18 may receive temperature information related to, or of, one or more cells within battery 14 and/or from various other portions of the engine 20, including the engine compartment. Based on type of battery 14 and various temperature information, engine control unit 18 may determine an appropriate voltage set point 23 and then may transmit voltage set point 23 as information 22 to voltage regulator 30. In some embodiments, engine control unit 20 may be configured to determine an appropriate excitation emergency threshold 44 based on temperature information received and/or sensed via its various inputs. In such embodiments, engine control unit 18 may transmit an appropriate excitation emergency threshold 44 to voltage regulator 30 of alternator 12 as information 22 via interface 24.

Engine 20 may be any form of internal combustion engine that may be common to vehicular applications. For example, engine 20 maybe a diesel engine, gasoline engine, hybrid-electric engine, and/or any form of engine suitable for the particular application.

Information 22 represents any signal, data, voltage, current, value, variable, or other metric capable of conveying temperature-dependent values and/or other information. Information 22 may include operating instructions for alternator 12. Information 22 may also include one or more voltage set points 23. Information 22 may also include temperature information received from various sensors associated with the battery 14. In some embodiments in which engine control unit 18, rather than voltage regulator 30, calculates an excitation emergency threshold 44, information 22 may include one or more excitation emergency thresholds 44. In addition, it should be understood that any voltage, current, threshold, or other metric discussed in the present disclosure may be represented and/or used by any component discussed herein in any appropriate form, including but not limited to any appropriate analog and/or digital value, variable, or other representation of the underlying metric.

Interface 24 may represent any combination of hardware, software, and controlling logic operable to receive and/or transmit information 22. Interface 24 may represent any communications protocol, such as a controller area network (CAN), FlexRay, DC-Bus, IDB-1394, IEBus, Inter-Integrated Circuit, Serial Peripheral Interface (SPI), Ethernet, Transmission Control Protocol (TCP), Internet Protocol, and/or Universal Serial Bus (USB). In some embodiments, interface 24 may represent a combination of such protocols. Interface 24 may, in some embodiments, represent a local interface network (LIN). LIN may comprise a serial network protocol configured to facilitate communications between components in vehicular systems. The LIN protocol may confirm to particular specifications that have been or will be published by the LIN Consortium and/or the International Organization for Standardization (ISO), such as ISO/DIS 17987-1.

Voltage regulator 30 represents any combination of hardware, software, controlling logic, circuitry, digital signal processing, and/or analog-to-digital conversion configured to perform the functions of a voltage regulator to deliver an excitation current 26 to rotor 28. Voltage regulator 30 may calculate excitation current 26 to provide the desired charging voltage 13 specified by the requested voltage set point 23. Particular embodiments of voltage regulator 30 are described in more detail with respect to FIG. 3 below. As described above, voltage regulator 30 may output an excitation current 26 to rotor 28, which may in turn induce a magnetic field within stator 30 and thereby provide an alternating current to rectifier 32. Rectifier 32 represents any combination of hardware and circuitry operable to convert the received alternating current into a DC current. The DC current may be filtered as appropriate to produce a constant DC voltage to be supplied as charging voltage 13 to battery 14 and/or as a source voltage to vehicle loads 16.

In operation, engine control unit 18 may monitor the temperature of battery 14. Based on the internal logic of engine control unit 18, information 22 comprising one or more temperature-dependent values, such as voltage set point 23, sensed temperatures, or other temperature information, may be sent from engine control unit 18 to alternator 12 via interface 24. For example, voltage regulator 30 may receive one or more voltage set points 23 as information 22. In some embodiments, voltage regulator 30 may also may receive the charging voltage 13 as supplied to battery 14 as feedback. Based at least in part on these values, voltage regulator 30 may determine an excitation current 26 to apply to rotor 28. The excitation current 26 may be adjusted by voltage regulator 30 in order to output the desired charging voltage 13 to battery 14 based on temperature conditions and/or type of battery 14. In particular embodiments, voltage regulator 30 may additionally include logic and/or control circuitry to turn off the excitation current in the event that voltage regulator 30 detects that charging voltage 13 is above an excitation emergency threshold 44 that is a voltage level. Voltage regulator 30 may detect that charging voltage 13 is above excitation emergency threshold 44 in any appropriate manner. For example, voltage regulator 30 may monitor and/or sense charging voltage 13 as feedback. If charging voltage 13 is above the excitation emergency threshold 44, a safety feature may be enabled to disable charging voltage 13. The safety feature may be controlled independently from the mechanism for generating excitation current 26. As another example, emergency excitation threshold 44 may correspond to an appropriate excitation current 26 in addition to or in the alternative to corresponding to a voltage level. For instance, voltage regulator 30 may monitor and/or sense excitation current 26 to determine whether the excitation current 26 is above the excitation emergency threshold 44. The excitation emergency threshold 44 may accordingly be a measurement of excitation current 26, charging voltage 13, or other appropriate measurement that may be determined to cause the charging voltage 13 of battery 14 to be at or within an unacceptably close range of the outgassing voltage threshold 46 of battery 14 for a given temperature.

Voltage regulator 30 may store one or more battery-dependent profiles 60 that may be utilized to modify and/or set an excitation emergency threshold 44 based on a temperature-dependent value. Voltage regulator 30 may store multiple profiles 60 that include the relationship between the temperature-dependent value and excitation emergency threshold for one or more battery types. Voltage regulator 30 may be set, via a factory setting and/or user-configured control, to a particular battery and/or temperature profile 60. Thus, voltage regulator 30 may accommodate a variety of different types of vehicular control systems and batteries 14. Based on determining and/or setting the particular profile of battery 14 associated with a particular type of battery 14, voltage regulator 30 may determine an excitation emergency threshold 44 based on the correlation between the temperature-dependent value and the excitation emergency threshold 44 stored by that profile 60. For example, the excitation emergency threshold 44 may be determined based on a temperature-dependent voltage set point 23 supplied to the voltage regulator 30 by electronic control unit 18. Thus, a particular excitation emergency threshold 44 may depend upon type of battery 14 and upon temperature.

As voltage regulator 30 monitors charging voltage 13 and voltage set point 23 in order to adjust charging voltage 13 on an on-going basis, voltage regulator 30 may also monitor the excitation current 26 for any unacceptably high excitation conditions, that is, for example, conditions at or above the excitation emergency threshold 44. Excitation emergency threshold 44 may vary as a function of temperature. For example, voltage regulator 30 may regularly and/or continuously adapt the excitation emergency threshold based on an appropriate temperature-dependent value. Temperature-dependent values may include temperature-dependent voltage set point received as information 22 from interface 24, temperature sensor information from battery temperature sensors, and/or a excitation emergency threshold as determined by engine control unit 18. Various embodiments may include one or more of these values. A more detailed explanation of voltage regulator 30 including a description of various examples of how the operation of the excitation emergency off feature may be calculated based on temperature-dependent values as will be discussed below with respect to FIG. 3.

Voltage regulator 30 may also compare excitation current 26 and/or output voltage charging voltage 13 to excitation emergency threshold 44 to determine whether an emergency condition exists. The determination as to whether the excitation emergency threshold 44 is exceeded may include determining that the excitation emergency threshold 44 has been exceeded for a particular length of time and/or may be calculated to exclude temporary fluctuations in excitation current 26 and/or charging voltage 13. In the event that the excitation emergency threshold is exceeded, the excitation current 26 and/or charging voltage 13 may be disabled and/or shut off via an independent safety feature within voltage regulator 30. This feature may prevent damage to battery 14 and/or catastrophic failure of battery 14 in the event that a fault condition prevents voltage regulator 30 from otherwise controlling the excitation current 26 and/or charging voltage 13.

Figure 3:
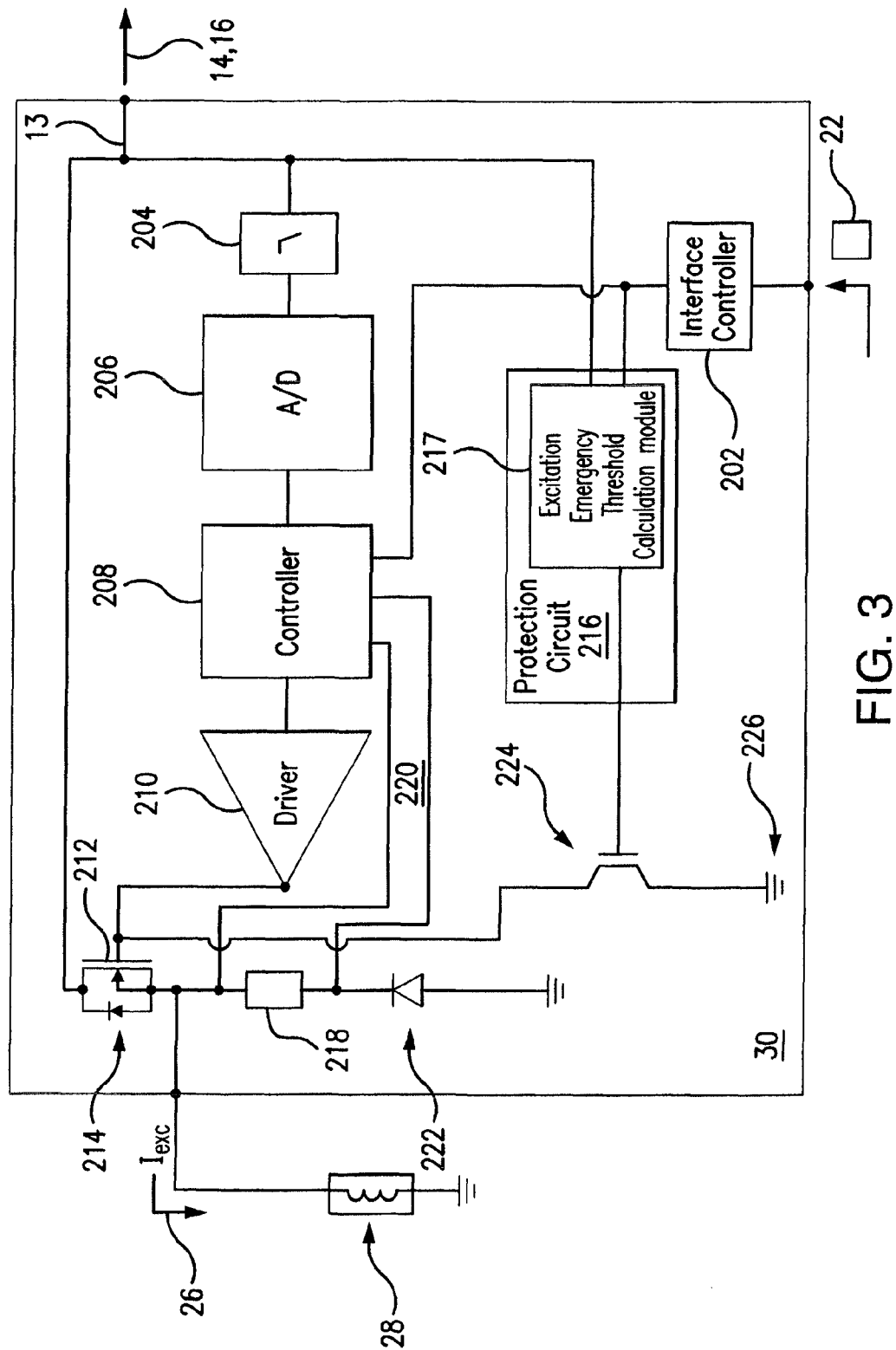
FIG. 3 is a simplified circuit diagram illustrating an alternator control circuit with a temperature-dependent safety feature.

FIG. 3 is a simplified circuit diagram illustrating one embodiment of voltage regulator 30 with a temperature-dependent excitation off feature. As illustrated, voltage regulator 30 includes an interface controller 202, a filter 204, an analog-to-digital convertor 206, a voltage regulator controller 208, a driver circuit 210 and a power switch 212. In the illustrated embodiment, power switch 212 is coupled to a diode 214. Voltage regulator 30 may also include a shunt resister 218 as part of a current sensor 220, a freewheeling diode 222, a safety switch 224, and a ground 226. The components of voltage regulator 30 generally function to determine an excitation current 26 to drive rotor 28 and thereby cause alternator 12 to output the desired charging voltage 13 to battery 14 and any vehicular loads 16. Excitation current 26 may be determined by controller 208 based on voltage set point 23 received via interface controller 202 from engine control unit 18. Excitation current 26 may also be determined based on charging voltage 13 received from alternator 12 as feedback. As illustrated, voltage regulator 30 also features a protection circuit 216 that monitors charging voltage 13 for high excitation conditions. Protection circuit 216 may, for example, include an excitation emergency threshold calculation module 217 that determines the appropriate excitation emergency threshold 44 based on one or more temperature-dependent values. Additional details of example calculations are described below in the discussion to follow. Excitation emergency threshold calculation module 217 may also be capable of enabling safety switch 224 in the event that charging voltage 13 is above a particular excitation emergency threshold 44. When safety switch 224 is enabled, the gate of power switch 212 may be pulled to ground, thereby driving excitation current 26 to zero.

Interface controller 202 may include an input that may be coupled to interface 24. Interface controller 202 may include an output coupled to protection circuit 216 and controller 208. For example, interface controller 202 may output voltage set point 23 to the inputs of controller 208 and protection circuit 218. Voltage regulator 30 may also include a feedback loop input for inputting charging voltage 13 to controller 208 and/or protection circuit 216. Charging voltage 13 may be fed back as a digital input to controller 208 via filter 204. In particular embodiments, the output of filter 204 may be connected to the input of analog-to-digital convertor (ADC) 206. Controller 208 may produce at its output a pulse modulated waveform that causes the driver circuit 210 to enable and disable power switch 212 according to a particular duty cycle. The selective enablement of power switch 212 according to a determined duty cycle may produce the desired excitation current 26 for rotor 28 of the alternator at the output of power switch 212.

Interface controller 202 includes any combination of hardware, software and controlling logic configured to receive information 22 from interface 24 and process information 22 into information usable by voltage regulator 30. Interface controller 202 may be configured to, for example, receive and/or process message frames as information 22 according to the LIN protocol. Controller 202 may also, in some embodiments, detect errors and/or provide appropriate data response generation under the LIN protocol. In various embodiments, Interface controller 202 may also include various functions such as a LIN wake-up function, filtering, receiving, transmitting, and/or overload protection. Interface controller 202 may be operable to receive information 22 comprising one or more voltage set points 23 from interface 24. In some embodiments, interface controller 202 may be configured to receive excitation emergency threshold as information 22 from engine control unit 18.

Filter 204 may represent any appropriate filter, such as a band-pass or low-pass filter, configured to remove white noise and/or other high-frequency irregularities from charging voltage 13 that is fed back to voltage regulator 30. Filter 204 may output a filtered charging voltage 13 value to ADC 206.

ADC 206 may represent any appropriate analog to digital converter configured to convert analog signals to digital values. ADC 206 may convert information from analog to digital domain and may out a digitized representation of filtered feedback of charging voltage 13 to controller 208.

Controller 208 may contain any appropriate combination of hardware, software, controlling logic, circuitry, and/or digital signaling processing configured to generate an appropriate PWM signal to drive excitation current 26 to the appropriate level. Controller 208 may include appropriate hardware and/or memory components to receive and/or store information 22, such as one or more voltage set points 23, received from interface controller 202. In some embodiments, controller 208 may include all or a portion of protection circuit 216. Controller 208 may store temperature profile information for various battery types. Accordingly, controller 208 may adjust voltage set point information and/or excitation emergency threshold information based on a setting and/or selection of a particular battery.

Driver 210 may represent any appropriate combination of hardware, software and controlling logic and/or circuitry configured to drive the excitation output PWM signal to the gate of power switch 212.

Power switch 212 includes any appropriate configuration of switching components operable to drive an appropriate excitation current 26 to rotor 28. For example, power switch 212 may represent one or more appropriate power transistors or other component configured to drive the desired level of current. Power switch 212 is illustrated as a DMOS transistor that is coupled to a diode 214. Diode 214 may represent a parasitic bulk diode. It should be noted, however, that power switch 212 may represent various types of power switches, including switches that include NMOS, PMOS, CMOS, and/or other types of transistors capable of driving a power current. In addition, it may be appreciated that diode 214 may be replaced by an appropriate complementary transistor to transistor.

Protection circuit 216 represents any appropriate combination of hardware, software, circuitry, and/or controlling logic operable to disable the output voltage of alternator 12. Protection circuit 216 may include an excitation emergency threshold calculation module 217, which may be configured to calculate the appropriate excitation emergency threshold 44 based on temperature information and/or battery type. For example, protection circuit 216 may determine to use an appropriate temperature profile based on battery size, capacity, type, chemical composition, product name, product number, product manufacturer. The temperature profile may store an appropriate temperature-dependent function to calculate an excitation emergency profile 44 based on the temperature information and the particular characteristics of the battery under charge. Using the excitation emergency threshold as determined by excitation emergency threshold calculation module 217, protection circuit 216 may determine whether safety switch 224 should be enabled in order to disable power switch 212. Protection circuit 216 may monitor voltage set point 23 and/or charging voltage 13 in order to determine whether excitation emergency threshold 44 (as determined by excitation emergency threshold calculation module 217) has been reached and/or exceeded.

Excitation emergency threshold calculation module 217 represents any appropriate combination of hardware, software, circuitry, and/or controlling logic operable to adjust and/or determine an appropriate excitation emergency threshold 44 based on temperature-dependent variables and/or temperature profiles of particular batteries 14. For example, excitation emergency threshold calculation module 217 may determine an excitation emergency threshold as a function of the voltage set point 23 information 22 received via interface controller 202. Voltage set point 23 may be a function of battery 14 and/or engine compartment temperature as determined by engine control unit 18 and/or voltage regulator 30. For example, the excitation emergency threshold 44 may be determined by adding a fixed value to the voltage set point 23. The fixed value may be determined based on the outgassing voltage 46 for the particular type of battery 14 and temperature of battery 14. In some embodiments, the excitation emergency threshold 44 may be determined as a linear, non-linear, geometric, quadratic, logarithmic, or other function of the temperature-dependent voltage set point 23. Additionally or alternatively, this functionality may be located within controller 208 and/or engine control unit 18. In implementations where the excitation emergency threshold 44 is determined in engine control unit 18, protection circuit 216 may be configured to receive the excitation emergency threshold 44 and voltage set point 23 from interface controller 202. In some embodiments, where measured and/or sensed temperature data may be received as information 22 on interface 24, protection circuit 216 may be capable of determining an appropriate excitation emergency threshold based on the temperature of battery 14.

Although illustrated as including an excitation emergency threshold calculation module 217, protection circuit 216 may include logic to determine an excitation emergency threshold 44 in any appropriate manner. For example, protection circuit 216 and/or excitation emergency threshold calculation module 217 may extract and/or infer temperature information from the voltage set point 23 received from ECU 18 via interface 24. Protection circuit 216 and/or excitation emergency threshold calculation module 217 may correlate the temperature dependence of the excitation emergency threshold 44 from the inferred temperature dependence of the voltage set point 23. The excitation emergency threshold 44 may thus be determined as a function of voltage set point 23 by any appropriate component.

Shunt resister 218, along with current sensor 220, may be another input to controller 208 and may be used by various embodiments of voltage regulator 30 as an overcurrent detection sensor.

In operation, voltage regulator 30 may receive voltage set points 23, other information 22, and/or charging voltage 13 provided as feedback. Controller 208 may determine an appropriate excitation current 26 based on those and/or other variables. Controller 208 may, based on a desired excitation current 26, determine an appropriate duty cycle for the PWM signal output to driver 210 and power switch 212. The PWM signal causes power switch 212 to apply an appropriate excitation current 26 to the alternator rotor 28, which causes the alternator to output the desired charging voltage 13.

In some embodiments, voltage regulator 30 may determine a value for temperature-dependent excitation emergency threshold 44 using protection circuit 216. Additionally or alternatively, voltage regulator 30 may receive a temperature-dependent excitation emergency threshold from interface control via interface controller 202. To determine an appropriate PWM signal duty cycle to achieve a desired excitation current 26 and/or charging voltage 13, charging voltage 13 is provided as feedback, where it may be filtered, digitized, and input to controller 208 along with voltage set point 23 and/or current sensed by current sensor 220.

Controller 208 determines an appropriate duty cycle of the pulse width modulated signal output to driver 210 and power switch 212, based on voltage set point 23 and feeding back of charging voltage 13 to controller 208. Controller 208 may determine the pulse width modulated signal to in a manner calculated to achieve a desired excitation current and a corresponding desired charging voltage 13 that is rectified by rectifier 32.

In some embodiments, engine control unit 18 may determine and/or adjust the appropriate voltage set point 23 based on temperature readings from battery 14 and/or one or more battery temperature profiles stored by a memory within engine control unit 18. Additionally or alternatively, this functionality may be implemented in any appropriate component of a vehicular control system, including but not limited to voltage regulator 30.

Protection circuit 216 and/or excitation emergency threshold 44 calculation module 217 may determine an appropriate excitation emergency threshold 44 based on the temperature-dependent voltage set point 23 information received from interface controller 202. For example, protection circuit 216 may take into account the relationship between a temperature-dependent voltage set point 23 and an outgassing voltage threshold 46 for that battery 14 at that temperature. The relationship between these values is explained in more detail below with respect to FIG. 3. Protection circuit 216 may determine the appropriate excitation emergency threshold 44 value based on the type of battery 14 that is being charged. For example, protection circuit 216 may store various temperature-dependent excitation emergency threshold profiles for different battery types. Accordingly, the excitation emergency threshold 44 determined for a battery 14 at one temperature may be different for a different type of battery 14 at the same temperature. For example, the excitation emergency threshold 44 may be lower for lithium ion batteries than for lead acid batteries.

Protection circuit 216 may determine an appropriate excitation emergency threshold 44 as a function of temperature. In some embodiments, protection circuit 216 may extract, calculate, and/or estimate temperature based on the specified voltage set point 23 received from engine control circuit 18. For example, voltage set point 23 may be determined by engine control unit 18 as a function of the voltage level of battery 14 and temperature data associated with battery 14. In some embodiments, protection circuit 216 may add an appropriate fixed offset to received voltage set point 23 to calculate excitation emergency threshold 44 and/or calculate excitation emergency threshold 44 in any appropriate manner as discussed above. As another example, protection circuit 216 may be programmed to geometrically decrease an offset as temperature increases. It may be appreciated that as the temperature of battery 14 increases linearly, outgassing voltage threshold 46 may geometrically decrease. In other words, outgassing may occur at a voltage closer and closer to voltage set point 23 as temperature increases. In some embodiments, protection circuit 716 may apply an appropriate averaging and/or filtering function to a plurality of voltage set points 23 prior to extracting an appropriate excitation emergency threshold 44. For example, protection circuit 216 may be configured to average multiple voltage set points 23 received via interface 24. Additionally or alternatively, voltage regulator 30 may receive temperature information for battery 14 from engine control unit 18. In such embodiments, voltage regulator 30 may determine the appropriate excitation emergency threshold based directly on battery temperature.

Protection circuit 216 also determines whether the battery voltage $V_B$ and/or charging voltage 13 is above the determined excitation emergency threshold value 23. In the event that the battery voltage $V_B$ and/or charging voltage 13 is above excitation emergency threshold 44, an appropriate signal is enabled by excitation emergency threshold calculation module 217 on the output of protection circuit 216 to cause safety switch 224 to pull the input to the power switch 212 to ground 226. Although a particular manner of disabling the output of alternator 23 is illustrated, it will be appreciated that any appropriate manner of disabling output of charging voltage 13 is within the scope of the present disclosure. Accordingly, voltage regulator 30 may include any circuitry configured to protect battery 14 from overcharge conditions, which may occur in the event of electronic faults or other errors that may cause power switch 212 to become permanently or semi-permanently "stuck" in the enabled position. The present disclosure recognizes that overcharge conditions may vary depending on temperature profiles of particular batteries, and includes appropriate mechanisms for adjusting excitation emergency threshold 44 based on temperature.

FIG. 4 is a chart illustrating particular voltage characteristics over the temperature of battery 14 for various embodiments of a excitation emergency off feature. FIG. 4 may represent a temperature profile for a particular type of battery 14, such as a lead acid battery. As may be appreciated by one of skill in the art, different batteries 14 may have different temperature profiles. Temperature profiles may account for battery size, capacity, type, chemical composition, product name, product number, product manufacturer, and/or other appropriate characteristics. As shown in FIG. 4, charging voltage 13 is depicted on the vertical axis and temperature of battery 14 is depicted on the horizontal axis. As the temperature of battery 14 increases, the appropriate charging voltage 13 decreases. Engine control unit 18 may be programmed to determine the appropriate voltage set point 23 according to a temperature profile appropriate for the particular battery 14 under charge. Accordingly, engine control unit 18 may adjust and/or determine voltage set point 23 based on temperature information received from appropriate sensors in the vicinity of battery 14.

Engine control unit 18 may output voltage set point 23 and/or temperature information to voltage regulator 30. In some embodiments, however, engine control unit 18 may not output the temperature information to alternator 12, which may not otherwise have access to such information. Accordingly, some embodiments of alternator 12 may include a fixed excitation emergency threshold 144 as illustrated in FIG. 4. In the event that charging voltage 13 exceeds the fixed excitation emergency threshold 144, protection circuit 216 may disable the output of charging voltage 13.

In some embodiments, however, there may advantages to decrease the excitation emergency threshold 44 as temperature increases. For example, the outgassing voltage for a particular battery 14 may decrease as a function of increasing temperature. Accordingly, a fixed excitation emergency threshold 144 may be disproportionately higher than the outgassing temperature at high temperatures. Accordingly it may be beneficial to adjust the excitation emergency threshold 44 by a fixed offset that decreases the excitation emergency threshold 44 as a function of the temperature, as shown by variable excitation emergency thresholds 146 and 148 in FIG. 4. In some embodiments, the determination of the excitation emergency threshold 44 may be a function of temperature of battery 14 subtracted from an offset, as shown by excitation emergency threshold 148. This may allow the excitation emergency threshold 44 to decrease non-linearly with charging voltage 13 as the temperature of battery 14 increases.

Figure 5:
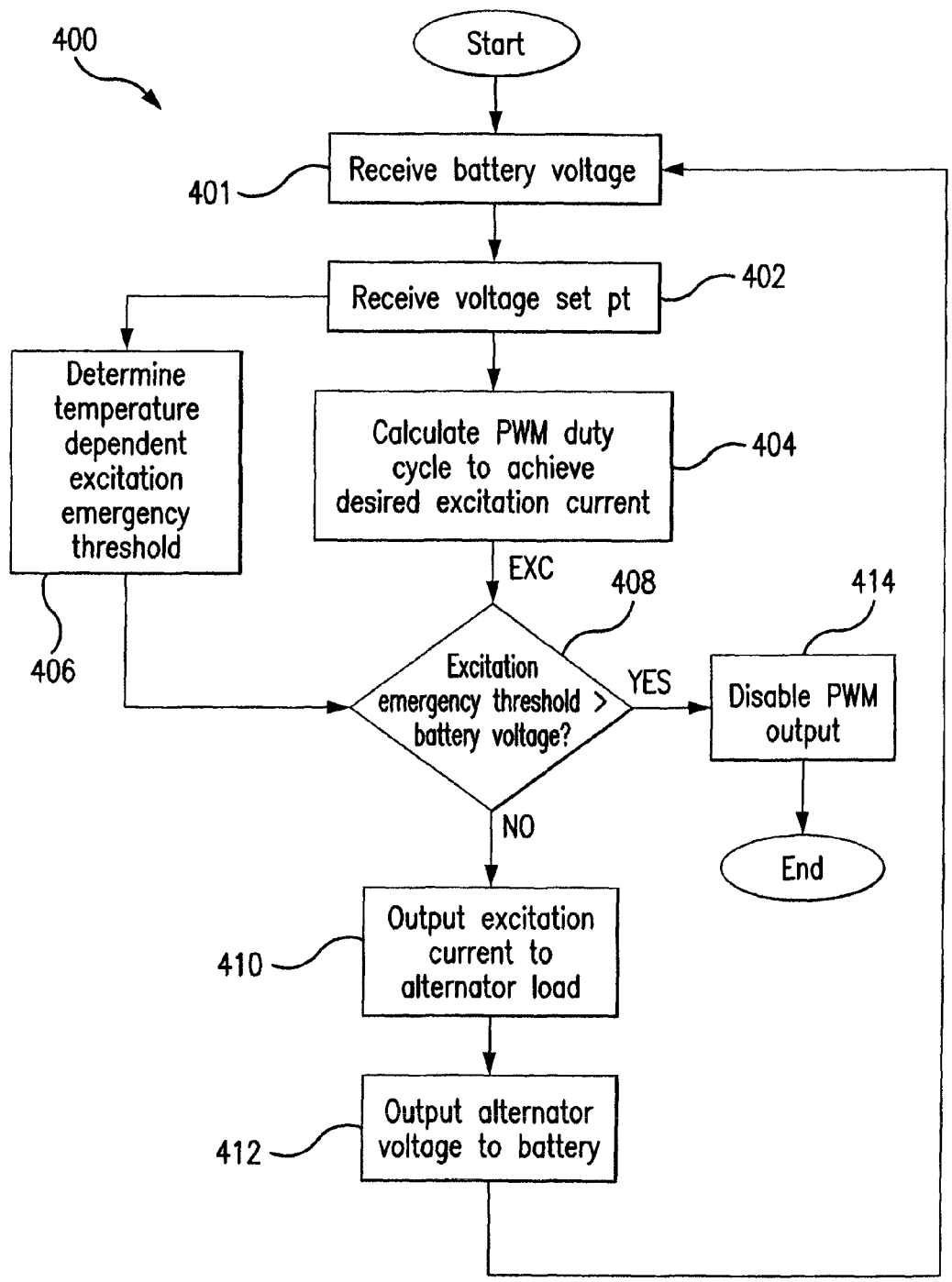
FIG. 5 is a flowchart illustrating a method for alternator control with a temperature-dependent safety feature.

FIG. 5 is a flowchart illustrating a method 400 for control of an alternator, for example alternator 12, with a temperature-dependent safety feature. Method 400 begins at step 401, in which a charging voltage 13, is received by voltage regulator 30. At step 402, voltage set point 23 is also received. These steps may occur simultaneously and/or in parallel in various embodiments. In some embodiments, step 402 may include receiving an excitation emergency threshold 44 from engine control unit 18 and/or temperature of the associated battery, such as battery 14.

At step 404, the method includes processing the received voltage set point 23 and the level of the charging voltage in order to calculate an appropriate duty cycle for the PWM signal to be output to the power switch 212. For example, charging voltage 13 may be detected and/or measured as feedback and may be filtered, digitized, transmitted to controller 208. A particular one or more voltage set points 23 may also be transmitted to controller 208. Controller 208 may, based on the received voltage set point 23 and the feed-back charging voltage 13, calculate an appropriate PWM duty cycle. The PWM duty cycle may be calculated to achieve the desired excitation current 26, which is in turn calculated to achieve the desired charging voltage 13 of alternator 12.

At step 406, which may occur independently and/or in parallel with steps 401 through 404, protection circuit 216 may determine an appropriate temperature-dependent excitation emergency threshold. This determination may be made in any appropriate manner, including any one or more of the examples described above. For example, the excitation emergency threshold 44 may be determined by engine control unit 18 as a function of temperature of battery 14 and transmitted across interface to voltage regulator 30. Additionally or alternatively, the excitation emergency threshold 44 may be calculated based on information 22 that is temperature dependent received via interface 24. In that case, excitation emergency threshold 44 may be determined by protection circuit 216 as a function of temperature information 22. For example, excitation emergency threshold 44 may be determined according to one or more of the examples described above with respect to FIG. 3.

If, at step 408, the charging voltage 13 is less than the determined temperature-dependent excitation emergency threshold 44, then alternator 12 may continue to step 410, in which the excitation current 26 will be applied to alternator load 28. The function of the alternator 12 under an excitation load may cause the alternator 12, at step 412, to output charging voltage 13 to battery 14. This may represent the normal function of alternator 12 when engine 20 is running. As alternator 12 runs during the normal running cycle of engine 20, method 400 will continue to output charging voltage 13 to battery 14 at step 412, and the alternator control loop may continually repeat, beginning each cycle at step 401. For example, voltage set point 23 may be continuously and/or periodically updated at step 402 via the engine control unit 18. This may cause the voltage regulator 30 to adjust the PWM cycle accordingly at step 404.

If at any point in the operation of alternator 12, however, at step 408, the charging voltage 13 is determined by protection circuit 216 to be greater than the excitation emergency threshold 44, then the method will proceed to step 414 and the PWM signal may be prevented from enabling power switch 212. This may be accomplished, for example, by using a safety switch 224 to ground the gate of power switch 212. Protection circuit 216 may thus prevent battery overcharge conditions caused by charging voltage 13 that is at or above a desirable excitation emergency threshold 44.

The preceding flowchart illustrates particular methods used for alternator control with a temperature-dependent excitation emergency off feature. However, these flowcharts illustrate only exemplary methods of operation, and system 10 contemplates individuals and/or devices using any suitable techniques, elements, and applications for performing these functions. Thus, many of the steps in the flowcharts may take place simultaneously and/or in different orders than shown. In addition, methods may include additional steps or fewer steps, so long as the method remains appropriate. Moreover, one or more devices of system 10 may work independently and/or in conjunction with other elements of system 10 to provide a temperature-dependent excitation off feature. Moreover, functions that are described as being implemented or performed by a particular component may be implemented by any appropriate component described herein. For example, many functions described as being performed by voltage regulator 30 may be performed by engine control unit 18, and vice versa.

Although the present disclosure has been described in several embodiments, a myriad of changes and modifications may be suggested to one skilled in the art, and it is intended that the present disclosure encompass such changes and modifications as fall within the present appended claims. In addition, it is contemplated that various embodiments may be combinable and/or represent various aspects of a single embodiment.

What is claimed is:

1. A method for controlling an alternator, comprising:
   determining a temperature-dependent first value associated with a battery, coupled to an alternator;
   determining an excitation emergency threshold for the alternator based on the determined temperature-dependent first value associated with the battery, wherein the excitation emergency threshold comprises a temperature-dependent second value that indicates that a controller of the alternator is failing to regulate a voltage associated with the battery to a voltage set point; and
   initiating, by the controller of the alternator, at least one safety measure upon a determination that a voltage associated with the battery exceeds the determined excitation emergency threshold.

2. The method of claim 1, further comprising:
   receiving, by the controller of the alternator, the voltage set point; and
   determining, based at least in part upon the received voltage set point, the temperature-dependent first value associated with the battery.

3. The method of claim 1, wherein the method further comprises: receiving, via an interface to an engine control unit, the excitation emergency threshold.

4. The method of claim 1, wherein the at least one safety measure comprises disabling the voltage associated with the battery.

5. The method of claim 1, further comprising disabling the voltage associated with the battery by pulling a pulse width modulated signal to ground.

6. The method of claim 1, wherein the controller determines the excitation emergency threshold based at least in part upon one or more of a type of the battery, a size of the battery, a capacity of the battery, a manufacturer of the battery, and a product number of the battery.

7. The method of claim 6, wherein the controller determines the excitation emergency threshold based on one or more temperature profiles.

8. An apparatus comprising:
   an output configured to provide a charging voltage as a feedback; and
   a control circuit coupled to the output, the control circuit operable to:
      determine a temperature-dependent first value associated with a battery coupled to an alternator;
      determine an excitation emergency threshold for the alternator based on the determined temperature-dependent first value associated with the battery, wherein the excitation emergency threshold comprises a temperature-dependent second value that indicates that the control circuit is failing to regulate the charging voltage to a voltage set point; and initiate at least one safety measure upon a determination that the charging voltage exceeds the determined excitation emergency threshold.

9. The apparatus of claim 8, wherein the temperature-dependent first value comprises the voltage set point.

10. The apparatus of claim 8, wherein the control circuit is further operable to receive, via an interface, the excitation emergency threshold.

11. The apparatus of claim 8, wherein the control circuit is further operable to:
based at least in part upon determining that the charging voltage exceeds the excitation emergency threshold, disable the charging voltage.

12. The apparatus of claim 11, wherein the control circuit is further operable to:
generate, based at least in part on the charging voltage and the voltage set point, an excitation current to be applied to an alternator load, wherein the excitation current is disabled by a signal that pulls a power switch to ground.

13. The apparatus of claim 8, wherein the control circuit determines the temperature-dependent first value based at least in part upon one or more of a type of the battery, a size of the battery, a capacity of the battery, a manufacturer of the battery, and a product number of the battery.

14. The apparatus of claim 13, wherein the control circuit determines the excitation emergency threshold based on one or more temperature profiles.

15. A system comprising:
an alternator configured to provide an output voltage to a vehicle battery;
an engine control unit coupled to the alternator via an interface;
wherein the alternator comprises a circuit to control the alternator and the circuit is configured to:
determine, based on information received from the engine control unit via the interface, a temperature-dependent first value associated with a battery coupled to the alternator;
determine an excitation emergency threshold for the alternator based on the determined temperature-dependent first value associated with the battery, wherein the excitation emergency threshold comprises a temperature-dependent second value that indicates that a controller of the alternator is failing to regulate a voltage associated with the battery to a voltage set point; and
initiate at least one safety measure upon a determination that the output voltage exceeds the determined excitation emergency threshold.

16. The system of claim 15, wherein the temperature-dependent first value comprises a voltage set point.

17. The system of claim 15, wherein the circuit to control the alternator is further operable to receive, via the interface, the excitation emergency threshold.

18. The system of claim 15, wherein the circuit to control the alternator is further operable to:
based at least in part upon determining that the output voltage exceeds the excitation emergency threshold, disable the charging voltage to the battery.

19. The system of claim 18, wherein the circuit to control the alternator is further operable to generate, based at least in part on the output voltage and a voltage set point, an excitation current to be applied to an alternator load, wherein the excitation current is disabled by a signal that pulls a power switch to ground.

20. The system of claim 15, wherein the circuit to control the alternator is further operable to determine the excitation emergency threshold based at least in part upon one or more of a type of the battery, a size of the battery, a capacity of the battery, a manufacturer of the battery, and a product number of the battery.

* * * * *